United States Patent [19]

Iyeta

[11] 4,207,463
[45] Jun. 10, 1980

[54] ROTATION ANGLE SENSOR

[75] Inventor: Motoi Iyeta, Hamamatsu, Japan

[73] Assignee: Nippon Gakki Seizo Kabushiki Kaisha, Japan

[21] Appl. No.: 877,820

[22] Filed: Feb. 14, 1978

[30] Foreign Application Priority Data

Feb. 14, 1977 [JP] Japan .................... 52-14081

[51] Int. Cl.$^2$ .............................................. G01D 5/34
[52] U.S. Cl. ........................... 250/231 SE; 250/237 R
[58] Field of Search .................... 250/209, 210, 231 R,
250/231 SE, 237 R, 237 S; 356/169; 324/17 S

[56] References Cited

U.S. PATENT DOCUMENTS

| | | | |
|---|---|---|---|
| 3,171,034 | 2/1965 | Tomasolo et al. | 250/211 K |
| 3,689,079 | 9/1972 | Matsuda et al. | 250/231 SE |
| 3,853,191 | 12/1974 | Yamagiwa | 250/231 SE |
| 3,875,405 | 4/1975 | Ferguson | 250/231 SE |

*Primary Examiner*—David C. Nelms
*Attorney, Agent, or Firm*—Ostrolenk, Faber, Gerb & Soffen

[57] ABSTRACT

As a substitute for the conventionally used pair of polarizer panels, a sensor disc is used in relatively rotatable combination with a pair of photo-sensitive elements arranged spatially on one side of the sensor disc and a light source system arranged spacially on the other side of the sensor disc. The optical transmittancy of the sensor disc changing either continuously and/or discontinuously in a selected diametral direction. The difference in the incident optical quantity caused by relative rotation of the disc and the elements causes generation of corresponding output from a detecting mechanism electrically coupled to the elements. The wide range of the detectable rotation angle enables advantageous use of the sensor for a navigation course finder, linear tracking arm system for record players, automatic steering system and weighing balance.

12 Claims, 27 Drawing Figures

Fig. 13
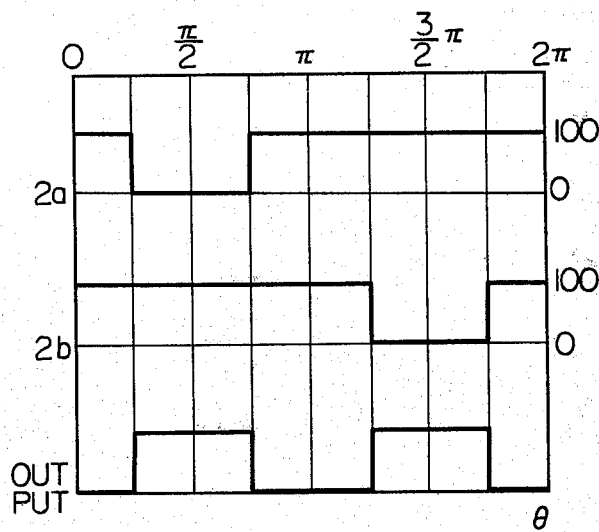
Fig. 14A   Fig. 14B
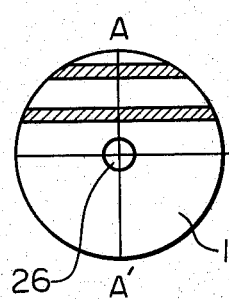
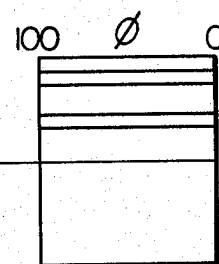

ROTATION ANGLE SENSOR

BACKGROUND OF THE INVENTION

The present invention relates to an improved rotation angle sensor, and more particularly relates to a novel rotation angle sensor utilizing a photoelectric system containing, as a principal components, a sensor disc of a specially designed optical transmittancy distribution for easy and accurate detection of rotation angle of a body.

In order to know whether or not a certain body is advancing correctly in the originally purposed direction and what is the degree of deviation in advancing direction of the body from the standard direction, it is necessary to detect the rotation angle of the body from the original direction or the standard direction. A typical example of such a rotation angle system is the well known gyrocompass which utilizes the earth magnetism and takes the north-south direction as the above-described standard direction. There is another type of the rotation angle detection which is carried out on the basis of change in the optical quantity transmitting through a light permeable panel, the change being caused by rotation of the panel about a selected rotation axis.

One example of the conventional rotation angle detecting system utilizes a pair of polarizer panels used in combination with each other. The pair of polarizer panels are arranged in spaced relationship with each other in the direction of the rotation axis. One of the polarizer panels is arranged immovably and the other is arranged rotatably about the rotation axis. Rotation of one polarizer panel relative to the other polarizer panel causes a change in the optical quantity transmitting through the two polarizer panels. Thus, the magnitude of the above-described change in the transmitting optical quantity detects the rotation angle of a given body, which is fixed to the other polarizer panel.

Now, taking the disposition as the 0 degree rotation angle, i.e. the standard direction, in which the transmitting optical quantity shows the middle value, the transmitting optical quantity reverses at the rotation angle of ±45 degrees from the standard direction. In other words, in the case of the conventional rotation angle detecting system utilizing the pair of polarizer panels, it is quite impossible to detect change in the direction exceeding ±45 degrees from the standard direction, which is very inconvenient for practical uses.

SUMMARY OF THE INVENTION

It is the principal object of the present invention to provide a rotation angle sensor well suited for detection of rotation angle over a very wide range which can hardly be attained by the conventional system.

It is another object of the present invention to provide a rotation angle sensor capable of detecting rotation angle of a given body with extremely high accuracy.

It is the other object of the present invention to provide a novel rotation angle sensor generative of a wide variety of function waveform signals.

It is a further object of the present invention to provide a novel rotation angle sensor well suited for a wide variety of applications such as navigation course finding, automatic steering and weighing.

It is a further object of the present invention to provide a rotation angle sensor advantageously usable for easy compensation of deviation in direction from the standard.

In accordance with the present invention, a light transmissible sensor disc is used in relatively rotatable combination with a pair of photo-sensitive elements arranged spatially on one side of the sensor disc and a light source system spatially arranged on the other side of the sensor disc and the photo-sensitive elements are electrically coupled to a mechanism for detecting difference in incident optical quantity. The optical transmittancy of the sensor disc changes along a selected diametral line but is constant along any line crossing at right angles to the diametral line. The photo-sensitive elements are arranged on a diametral line at positions on both sides of the center of the sensor disc.

In one preferred embodiment of the present invention, the sensor disc is rotatable about the center thereof and the photo-sensitive elements with the light source system are arranged immovably. In the other preferred embodiment of the present invention, the sensor disc is arranged immovably and the photo-sensitive elements with the light source system are revolvable about the center of the sensor disc. Including both cases, the center of the sensor disc will hereinafter be referred to as the "center of rotation" for the purposes of simplicity. The optical transmittancy of the sensor disc may change either continuously or discontinuously. In some cases, continuous change may be employed in combination with discontinuous change.

BRIEF EXPLANATION OF THE DRAWINGS

FIG. 13 is a graphical representation of the function waveform signal produced by the generator shown in FIGS. 12A and 12B, FIGS. 14A and 14B are explanatory sketches of the other embodiment of the rotation angle sensor in accordance with the present invention used as a function waveform signal generator.

DETAILED DESCRIPTION OF EMBODIMENTS

Figure 1A:
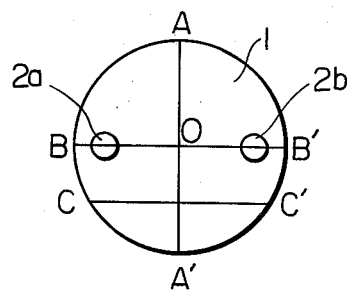
FIG. 1A is an explanatory plan view of one embodiment of the rotation angle sensor in accordance with the present invention.

FIG. 1A depicts a basic embodiment of the sensor disc which forms the principal part of the rotation angle sensor in accordance with the present invention. The sensor disc 1 is supported rotatably about the center of rotation 0 thereof and provided with the following optical construction. That is, the optical transmittancy $\phi$ of the sensor disc 1 changes along the direction of a diametral line A A' passing through the center of rotation 0 and is constant along each straight line crossing at right angle with the above-described diametral line A A', e.g. a chord CC'. Here, the diametral line BB' crossing at right angle with the above described diametral line A A' and passing through the center of rotation 0 will hereinafter referred to as the "central or neutral line".

In the case of the illustrated embodiment, the optical transmittancy $\phi$ of the sensor disc 1 is 0% at one end A of the diametral line A A', 50% on the central or neutral line B B' and 100% at the other end A' of the diametral line A A'. The optical transmittancy $\phi$ changes continuously along the diametral line A A'. This continuous change of the optical transmittancy $\phi$ is graphically shown in FIG. 1B. In other words, no light is allowed to pass through the sensor disc 1 at the end A while there is no bar to free transmission of light through the sensor disc 1 at the end A'. Only half of the incident light is allowed to pass through the sensor disc 1 at positions on the central or neutral line B B'.

A pair of photo-sensitive elements 2a and 2b are arranged facing one side surface of the sensor disc 1 at symmetric positions to each other with respect to the center of rotation 0. In the illustrated disposition, the photo-sentive elements 2a and 2b are on a straight line corresponding to the centrol or neutral line B B'. In combination with the photo-sensitive elements 2a and 2b, one or more sets of light sources are arranged facing the other side surface of the sensor disc 1.

Figure 2A:
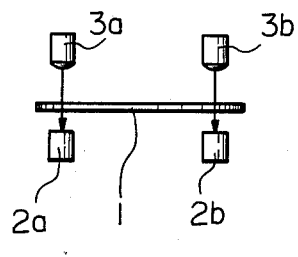
Figure 2B:
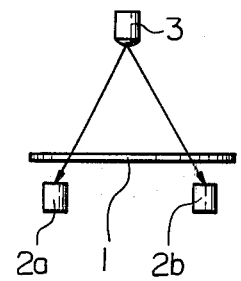

In the case of the embodiment shown in FIG. 2A, a pair of light sources 3a and 3b are provided, one 3a coacting mainly with the one photo-sensitive element 2a and the other 3b coacting mainly with the other photo-sensitive element 2b. In the case of the embodiment shown in FIG. 2b, only one light source 3 is used for the two photo-sensitive elements 2a and 2b.

Although the pair of photo-sensitive elements 2a and 2b in the illustrated embodiment are arranged symmetrically to each other with respect to the center of rotation 0, they may be arranged unsymmetrically to each other with respect to the center of rotation 0 when necessary.

The above-described photo-sensitive element has a function to linearly change its electric characteristics in accordance with magnitude of the incident optical quantity and, in general, is given in the form of a Cds, a CdSe, a photo-diode, a photo-transistor or a solar battery.

Combination of the sensor disc 1, the photo-sensitive elements 2a and 2b and the light source 3 may take various forms. In one instance, the photo-sensitive elements 2a, 2b and the light source are arranged immovably and the sensor disc 1 is arranged rotatably about the center of rotation 0. In the other instance, the sensor disc 1 is arranged immovably and the photo-sensitive elements 2a, 2b and the light source 3 are arranged revolvably about the center of rotation 0 while retaining their mutual positional relationship unchanged. Anyhow, it is necessary that the sensor disc 1 and the group of the photo-sensitive elements 2a, 2b and the light source 3 should be able to carry out relative rotation with respect to the center of rotation 0.

Figure 3:
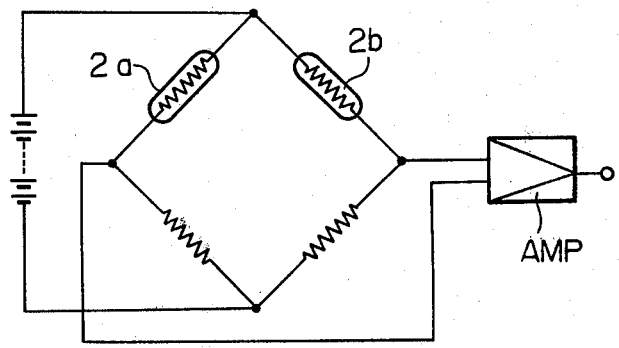
FIG. 3 is a circuit diagram of a balanced bridge circuit advantageously used for the rotation angle sensor shown in FIG. 1 as an incident optical quantity difference detecting mechanism.

An example of the mechanism for detecting difference in incident optical quantity between the pair of photo-sensitive elements 2a and 2b is shown in FIG. 3, in which the detecting mechanism takes the form of a balanced bridge circuit including the pair of photo-sensitive elements 2a and 2b as variable resistors. The output of the circuit is amplified by an amplifier AMP accompanying the circuit.

Sensing of rotation angle using the sensor shown in FIG. 1 will now be described in reference to the illustrations in FIGS. 4 and 5. In this case, it is assumed that the sensor disc 1 is rotatable about the center of rotation 0 whereas the photo-sensitive elements 2a, 2b and the associated light source 3 (or sources 3a, 3b) are immovably mounted to a suitable support not shown.

In the disposition shown in FIG. 1, the photo-sensitive elements 2a, 2b are both on a straight line corresponding to the central or neutral line B B' whereupon the optical transmittancy $\phi$ of the incident light is 50% for both photo-sensitive elements 2a, 2b. As the incident optical quantities to the photo-electric elements 2a and 2b are quite identical with each other, identical change in the electric characteristics occurs in both elements 2a and 2b and, therefore, the bridge circuit shown in FIG. 3 withholds the balanced state. Thus, the output from the bridge circuit is null.

Figure 4:
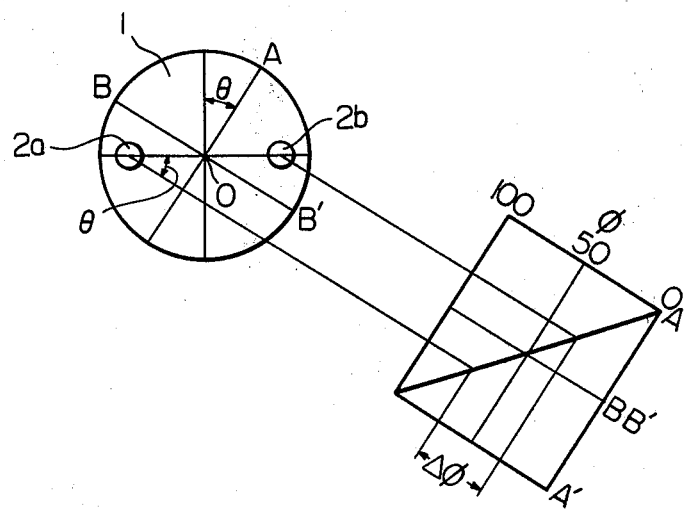
FIG. 4 is an explanatory sketch for showing the operation of the rotation angle sensor shown in FIG. 1.

Then, the sensor disc 1 rotates in the clockwise direction over rotation angle $\theta$ to assume the disposition shown in FIG. 4, in which the photo-sensitive elements 2a and 2b are on a line corresponding to a diametral line deviated from the central or neutral line BB' by the angle $\theta$. This deviation naturally causes corresponding difference in optical transmittancy $\Delta\phi$ between the two photosensitive elements 2a and 2b since the two elements 2a and 2b are on different chords perpendicular to the diametral line A A' and the optical transmittancy $\phi$ changes continuously along the latter. As already described, the photo-sensitive elements 2a and 2b change their electric characteristics linearly in accordance with the magnitude of the incident optical quantity. Thus, the above-described difference in optical transmittancy $\Delta\phi$ naturally leads to corresponding difference in the change of the electric characteristics of the photo-sensitive elements 2a and 2b to let the bridge circuit lose its balanced state and generate a corresponding output.

It will be well understood from the illustration that the magnitude of the difference in optical transmittancy $\Delta\phi$ is proportional to $\sin\theta$. That is, when the sensor disc 1 in the construction shown in FIG. 1 rotates about the center of rotation over ±90 degrees starting from the disposition shown in FIG. 1, the bridge circuit shown in FIG. 3 generates a sine-wave formed analog output such as shown in FIG. 5.

Figure 6:
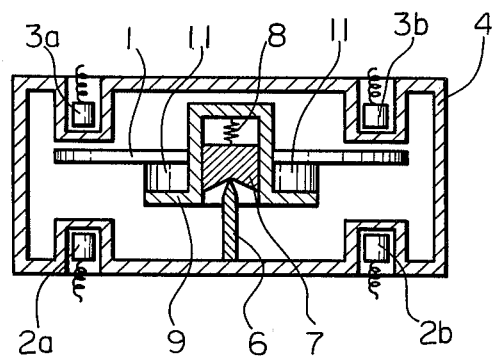
FIG. 6 is a side view, partly in section, of an example of the navigation course finder to which the rotation angle sensor in accordance with the present invention is advantageously applied.

FIG. 6 depicts an example of the navigation course finder in which the rotation angle sensor having the above-described basic construction and function is advantageously utilized. This navigation course finder principally makes use of the earth magnetism by which the above-described sensor disc is held immovably. The photosensitive elements and the light sources are revolvable about the center of rotation.

An upright pin 6 is coaxially secured to the inner bottom surface of a cylindrical closed casing 4 and a holder block 9 is freely turnably mounted atop the upright pin 6 via a seat 7 and a spring 8. In other words, the holder block 9 is suspensorily supported by the upright pin 6 for free rotation thereabout. A bipolar magnet 11 and the sensor disc 1 are coaxially and fixedly mounted to the holder block 9. That is, the sensor disc 1, the magnet 11 and the holder block 9 are rotatable together about the closed casing 4 via the upright pin. A pair of light sources 3a and 3b are disposed to the ceiling of the closed casing being positioned on a common straight line passing through the center axis of the closed casing 4, i.e. the center axis of the sensor disc 1 which corresponds to the above-described center of rotation 0 in FIGS. 1A and 4. At positions corresponding to those of the light sources 3a and 3b, a pair of photosensitive elements 2a and 2b are disposed to the bottom of the closing casing 4. The photo-sensitive elements 2a and 2b are electrically coupled to a suitable mechanism for detecting difference in incident optical quantity, e.g. the balanced bridge circuit shown in FIG. 1. The closed casing 4 is made of a suitable light transmissible material.

Figure 7A:
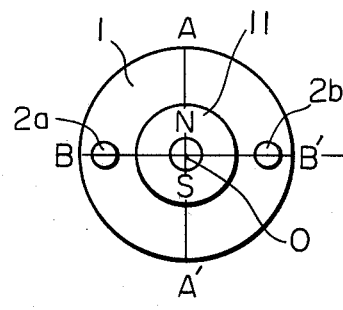
FIGS. 7A through 8B are explanatory sketches for showing the operation of the navigation course finder shown in FIG. 6.
Figure 7B:
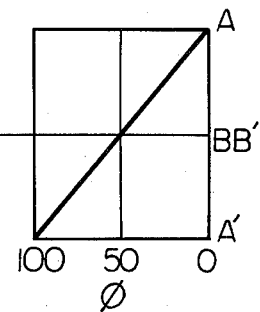

It is assumed that, as shown in FIGS. 7A and 7B, the optical transmittancy $\phi$ of the sensor disc 1 is 0% at one end A of a diametral line A A' passing through the center of rotation 0 which coincide with the center axis of the closed casing 4, 50% at positions on the central or neutral line B B', and 100% at the other end of the diametral line A A'. The optical transmittancy changes continuously along the diametral line A A'.

The navigation course finder of the above-described construction is fixed, for example, to a boat but in an axially rotatable disposition when any special external force is purposely applied thereto. Due to the influence of the earth magnetism, the sensor disc 1 is kept stationarily in a disposition in which the S-pole of the accompanying magnet 11 points to the north pole of the earth.

On the assumption that the two photo-sensitive elements 2a and 2b are positioned symmetrically with respect to the center of rotation 0 and are identical with each other regarding the optical transmittancy $\phi$, the both photo-sensitive elements 2a and 2b are on the central or neutral line B B' and are identical with each other regarding the incident optical quantity so long as the vehicle such as a boat sails exactly on the north course as shown in FIGS. 7A and 7B. Therefore, the bridge circuit such as shown in FIG. 3 withholds the balanced state and no output is generated by the circuit.

Figure 8A:
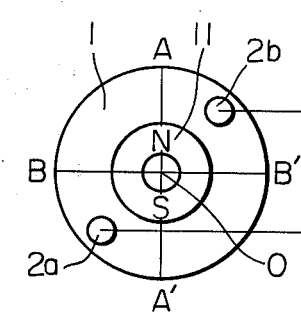
Figure 8B:
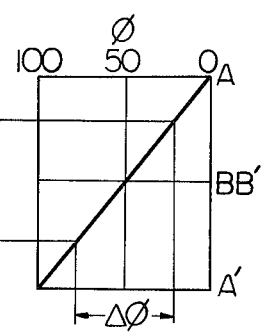

As the boat starts to sail off the true north course towards the north-west course, the closed casing 4 rotates counterclockwise about the center of rotation and the photo-sensitive elements 2a and 2b assume the new positions shown in FIG. 8A after deviation from the initial positions on the central or neutral line B B' shown in FIG. 7A. Now, the two photo-sensitive elements 2a and 2b are on different chords perpendicular to the diametral line A A' and differ from each other in their corresponding optical transmittancies $\phi$. The resulting difference in optical transmittancy $\Delta\phi$ makes the bridge circuit generate an output of a corresponding magnitude. As described previously, the magnitude of the difference in optical transmittancy is fairly proportional to the relative rotation angle $\theta$, i.e. the extent of deviation in the sailing course of the boat off the true north course. Therefore, the current sailing direction of the boat can be visually confirmed through analog or digital representation of the output generated from the bridge circuit. That is, taking the true north as the reference zero degree, it is possible to find the actual sailing course of the boat over 90 degrees on both sides of the true north course.

When the rotation angle sensor in accordance with the present invention is to be incorporated into the automatic steering system of a boat or cruiser as a navigation course finder, the servo-mechanism is so controlled as to offset the above-described output from the bridge circuit. That is, the reversible drive motor for the rudder operates so as to nullify the above-described difference in optical transmittancy $\Delta\phi$.

In addition to the above-described navigation course finding, the navigation course finder shown in FIG. 6 can be advantageously used for purposely changing the sailing course of the boat also when incorporated into the automatic steering system. Provided that the boat currently traces the true north course selected and it is required to change same to the east-northeast course, the closed casing 4 should forcibly be rotated clockwisely over 67.5 degrees. This rotation creates unbalanced state of the bridge circuit and the reversible drive motor turns the rudder so as to recover the balanced state of the bridge circuit, whereby the boat starts to trace the new east-northeast course. As the sailing course of the boat is exactly registered at the purposed east-northeast direction, the output from the bridge circuit becomes null and the boat now fairly traces and withholds the selected east-northeast course.

In contrast to the foregoing, when a pair of conventional polarizer panels are used in combination for the similar navigation course finding, normal finding of the change in direction can be guaranteed only within 45 degrees on both sides of the strand reference direction, i.e. the true north direction, only. For this reason, when the navigation course finder incorporating the conventional polarizer panels are used for the above-described change in the sailing direction of the boat, it is not usual to change the direction of the course over such a large angle as 67.5 degrees.

Figure 9:
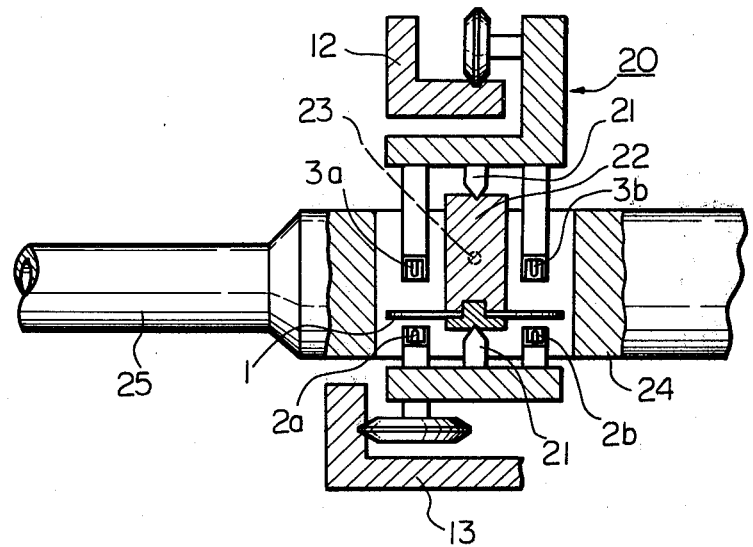
FIG. 9 is a side view, partly in section, of one example of the linear tracking arm system used for a record player to which the rotation angle sensor in accordance with the present invention is advantageously applied.

In the case of the arrangement shown in FIG. 9, the rotation angle sensor in accordance with the present invention is advantageously utilized in the construction of a linear tracking arm system for a record player. Contrary to the application to the navigation course finder, the sensor disc 1 in this case is rotatable about the center of rotation 0 and the photosensitive elements with the associated light sources are mounted immovably.

Figure 10A:
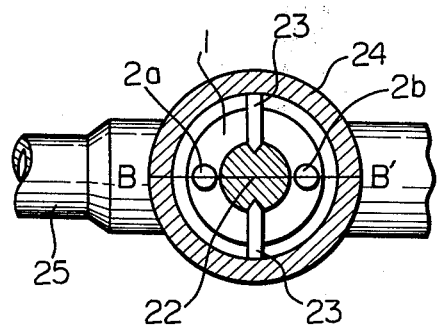
FIGS. 10A through 11B are explanatory sketches for showing the operation of the linear tracking arm system shown in FIG. 9, FIGS. 12A and 12B are explanatory sketches of one embodiment of the rotation angle sensor in accordance with the present invention used as a function waveform signal generator.

As shown in FIGS. 9 and 10A, the linear tracking arm system includes a carriage 20 movable along a pair of guide rails 12 and 13 extended substantially in the width direction of the record player. The carriage 20 is provided with a so-called gimbal of a tone arm 25 which enables the tone arm 25 to swing both in the horizontal and the vertical direction independently of the carriage 20. That is, the gimbal support includes an inner block 22 pivotally supported by a pair of vertical pins 21 fixed to the frame of the carriage 20 and an outer block 24 pivotally supported by the inner block 22 via a pair of horizontal pins 23 projecting inwardly therefrom. The outer block 24 fixedly supports the tone arm 25.

Here, it is required in general that the tone arm 25 should preferably always retain true tangency to the record groove on the turn table not shown. Reproduction of tones is in general effected via a cartridge (not shown) disposed to the operating end of the tone arm 25. Therefore, when the system is adjusted so as to slash possible tracking error in the peripheral area of the disc record, another tracking error may take place in the inner central area of the disc record plate. On the contrary, when the system is adjusted so as to cause less tracking error in the central area of the disc record plate, inevitable tracking error tends to occur in the peripheral area of the disc record. Occurrence of the tracking error often generates corresponding tone strains in the secondary higher harmonics and the fidelity of the tonal reproduction is disgracefully lowered.

In accordance with the present invention, the linear tracking arm system is provided with a sensor disc 1 coaxially fixed to the innear block 22, a pair of photosensitive elements 2a and 2b arranged on the frame of the carriage 20 under the sensor disc 1 at positions symmetric to the center axis, i.e. the center of rotation, of the sensor disc 1, and a pair of light sources 3a and 3b arranged on the frame of the carriage 20 above the sensor disc 1 at postitions corresponding to those of the photosensitive elements 2a and 2b, respectively.

Figure 10B:
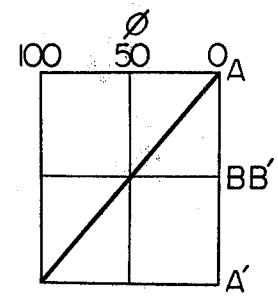

As shown in FIGS. 10A and 10B, the optical transmittancy $\phi$ of the sensor disc 1 is 0% at one end A of a diametral line A A' passing through the center of rotation, 50% at positions on the central or neutral line BB' and 100% at the other end A' of the diametral line AA'. The optical transmittancy $\phi$ further changes continuously along the diametral line AA'. The photo-sensitive elements 2a and 2b are positioned on the central or neutral line BB' so long as the tone arm 25 keeps true tangency to the record groove on the turn table (not shown). In this disposition, the diametral line AA' intersects the axial direction of the tone arm 25 at a right angle.

When the tone arm 25 holds true tangency to the record groove on the turn table as shown in FIG. 10A, the photo-sensitive elements 2a and 2b are positioned on the central or neutral line BB', there is no difference in the incident optical quantity, the balanced state of the detecting mechanism such as the bridge circuit shown in FIG. 3 is maintained and the output therefrom remains null.

Figure 11A:
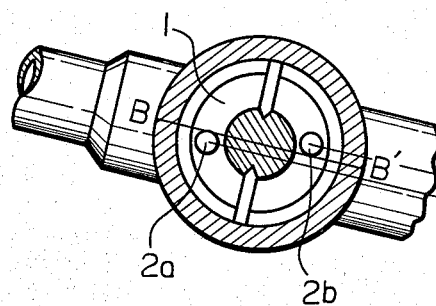
Figure 11B:
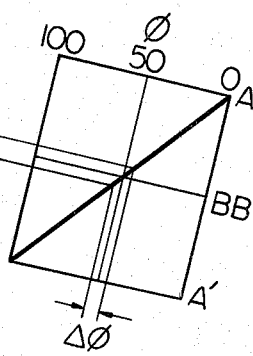

In the disposition shown in FIGS. 11A and 11B, the tone arm 25 has lost its true tangency to the record groove. This disappearance of the true tangency usually occurs since the stylus moves towards the center of the record plate along the record groove while causing accompanied movement of the tone arm holding the stylus and the carriage 20 does not fairly follow this movement, thereby causing the above-described disappearance of the true tangency. Upon disappearance of the true tangency, the photo-sensitive elements 2a and 2b are brought to new positions deviated from those on the neutral line BB'. There is produced a difference in the incident optical quantity corresponding to the difference in optical transmittancy $\Delta\phi$. The balanced state of the bridge circuit is lost and an output corresponding to the above-described difference in optical transmittancy $\Delta\phi$ is generated by the bridge circuit. This output from the bridge circuit is passed to the servomechanism as a control signal. Upon receipt of the control signal, the servomechanism drives the carriage 20 for displacement along the guide rails 12 and 13 in order to offset the deviation of the tone arm 25 off the true tangency. It will be very clear from the foregoing description that employment of the present invention in the construction of the linear tracking arm system for a record player assures high operational accuracy and enhanced fidelity in the tone reproduction with greatly simplified mechanical construction.

Figure 1B:
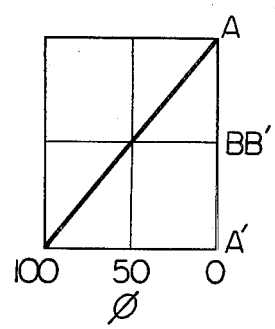
FIG. 1B is a graphic representation of the change in the optical transmittancy of the sensor disc used in the rotation angle sensor shown in FIG. 1A, FIGS. 2A and 2B are explanatory side views for showing different arrangements of the light source system usable for the rotation angle sensor shown in FIG. 1A.

In the case of the foregoing applications of the present invention, it is assumed for the purposes of easier explanation and understanding that the optical transmittancy $\phi$ of the sensor disc 1 changes continuously and linearly along a diametral line thereof. However, in accordance with the basic requirement in the present invention, it is sufficient that the change in the optical transmittancy $\phi$ of the sensor disc 1 should simply be continuous along the diametral line. It is not always required that the optical transmittancy $\phi$ of the sensor disc 1 should be 50% at positions on the central or neutral line BB' as shown in FIGS. 1B, 7B and 10B. In the similar sense, it is not always required that the optical transmittancy $\phi$ of the sensor disc 1 should change linearly along the diametral line.

In addition to the foregoing applications, the rotation angle sensor in accordance with the present invention can be used for a variety of function waveform signal generators. Conventionally, generation of such function waveform signals has been carried out utilizing electric systems such as an oscillation circuit, a sine waveform oscillator, a square waveform oscillator and a pulse oscillator. In accordance with the present invention, tactful combination of mechanical systems with electric systems assures easy generation of various complicated waveform signals.

Figure 5:
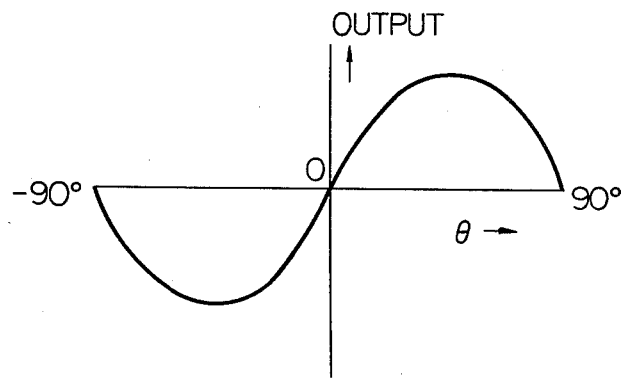
FIG. 5 is a graphical representation of one example of the output from the circuit shown in FIG. 3.

For example, a combination of the construction shown in FIGS. 1A through 2B with the mechanism shown in FIG. 3 enables generation of the sine curve waveform signal such as shown in FIG. 5 when the sensor disc 1 is rotated in one selected direction at a constant angular velocity.

Figure 12A:
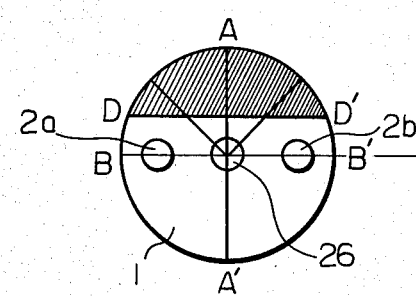
Figure 12B:
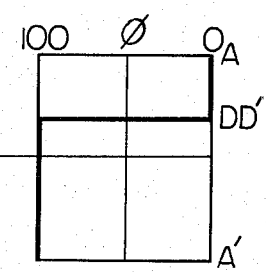

An embodiment of the function waveform signal generator in accordance with the present invention is shown in FIGS. 12A and 12B, in which the balanced bridge circuit outputs a rectangular waveform signal. In the case of this embodiment, the optical transmittancy $\phi$ of the sensor disc 1 is 0% in the area from one end A of the diametral line AA' to a chord DD' intersecting the diametral line AA' at a right angle and 100% in the area from the chord DD' to the other end A' of the diametral line AA'. The sensor disc 1 rotates about the center axis 26 thereof at a constant angular velocity.

As the rotation of the sensor disc goes on, the incident optical quantities of the photo-sensitive elements 2a and 2b undergo the time-functional change shown in FIG. 13 in which the rotation angle $\theta$ is taken on the abscissa. It will be observed that the balanced state of the bridge circuit is lost in the angular ambits wherein the two photo-sensitive elements 2a and 2b differ from each other in the incident optical quantity, i.e. the angular ambits extending from π/4 through 3π/4 radians and from 5π/4 through 7π/4 radians, respectively. As a result thereof a function signal OUTPUT having two rectangular waveforms per cycle is obtained as shown at the bottom in FIG. 13.

Figure 15:
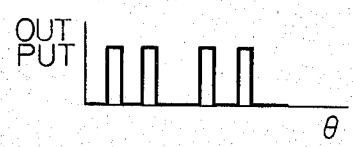
FIG. 15 is a graphical representation of the function waveform signal produced by the generator shown in FIGS. 14A and 14B, FIGS. 16A and 16B are explanatory sketches of a further embodiment of the rotation angle sensor in accordance with the present invention used as a function waveform generator.

In addition to the one shown in FIG. 13, a variety of rectangular waveform signals can be obtained by properly adjusting the mode of discontinuous change in the optical transmittancy φ. An example of such a variation is shown in FIGS. 14A and 14B, in which the optical transmittancy φ of the sensor disc 1 is 0% in the hatched stripe areas which run perpendicularly to the diametral line AA' and 100% in the remaining blank stripe areas. The sensor disc 1 has two 0% areas on one side of a diametral line crossing with the above-described diametral line AA'. Upon rotation of the sensor disc 1 in one selected direction at a selected constant angular velocity, a function signal OUTPUT such as shown in FIG. 15 is obtained which has four sets of rectangular waveforms per cycle.

It will be well understood from the foregoing that the frequency of the rectangular waveform function signal can be freely adjusted by changing the mode of discontinuous change in the optical transmittancy φ of the sensor disc 1.

The amplitude of the function signal can be fixed as desired by suitably adjusting the relative difference between the maximum and minimum optical transmittancy φ of the sensor disc.

Figure 16A:
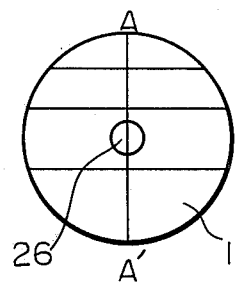
Figure 16B:
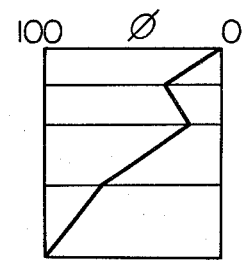
Figure 17:
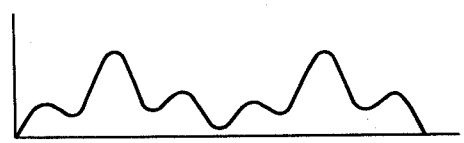
FIG. 17 is a graphical representation of the function waveform signal produced by the generator shown in FIGS. 16A and 16B.

In a further embodiment of the function waveform signal generator incorporating the rotation angle sensor in accordance with the present invention, the optical transmittancy φ may be changed continuously along the diametral line AA' by randomly increasing and decreasing the light transmittancy of the sensor disc 1 as shown in FIGS. 16A and 16B, whereby the output from the bridge circuit may have a waveform such as shown in FIG. 17. The output waveform has two different waves per cycle.

As is clear from the foregoing description a variety of waveform signals can easily be obtained as desired through employment of the rotation angle sensor in accordance with the present invention. Even very complicated waveform signals can be generated very easily even without using electric filters.

Figure 18:
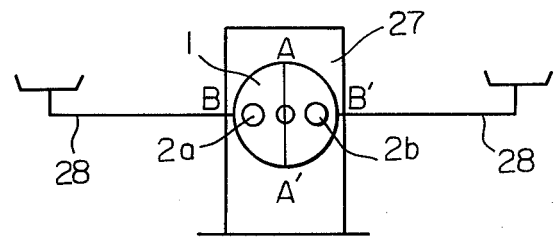
FIG. 18 is a front view of a weighing balance to which the rotation angle sensor in accordance with the present invention is advantageously applied.

In the embodiment shown in FIG. 18, the rotation angle sensor in accordance with the present invention is used for a balance in order to enhance accuracy in weighing. The sensor disc 1 shown in FIG. 1 is used and is fixed to beams 28 so that the central or neutral line BB' of the sensor disc 1 is in line with the beams 28. The sensor disc 1 carrying the beams 28 is then pivotally mounted at the center of rotation thereof to a stand 27 of the balance. At positions symmetric to the center of rotation of the sensor disc 1, a pair of photo-sensitive elements 2a and 2b are mounted to the stand 27 so that they are on the central or neutral line BB' of the sensor disc 1 when the beams 27 keep horizontal state. A pair of light source or a light source is arranged on the other side of the sensor disc 1 corresponding to the photo-sensitive elements 2a and 2b, which are coupled to a suitable optical quantity difference detecting mechanis such as the balance bridge circuit shown in FIG. 3 the output terminal of which is coupled to a suitable visual representation element such as a lamp.

So far as the balance is in the balanced state, the beams 28 remain in the horizontal state, the photo-sensitive elements 2a and 2b are both on the central or neutral line, there is no difference in the incident optical quantity, the bridge circuit retains the balanced state and no output is obtained from the bridge circuit. As the beams 28 incline, the photosensitive elements 2a and 2b are brought to positions off the neutral line BB', a difference is produced between the incident optical quantities of the two photo-sensitive elements and the bridge circuit loses its balanced state in order to turn on the lamp by its output. The magnitude of this output from the bridge circuit is naturally proportional to the degree of inclination of the beams 28. Thus, the magnitude of this output signal from the bridge circuit shows with high accuracy the difference between the weighed load and the standard weight, whereby the weight of the load being measured with extremely high accuracy. When an A-D convertor is used in combination with the detecting mechanism, the weight of the load can be represented in digital fashion, too.

As is clear from the foregoing description, employment of the present invention in summary assures the following advantages.

(a) Since a sensor disc whose optical transmittancy changes along a selected direction is used as the principal component, a wide range of rotation angle detection can be guaranteed despite of its very simple construction.

(b) When the above-described optical transmittancy of the sensor disc is made to change either continuously or discontinuously, a variety of function waveform signals can be obtained. More complicated function waveform signals can be obtained when the optical transmittancy changes either continuously and discontinuously. Thus, the rotation angle sensor in accordance with the present invention is well suited for use as a function waveform generator.

(c) The disposition of the pair of photo-sensitive elements on the central or neutral line B-B' along which the optical transmittancy change is zero, enables the difference in optical quantity to be accurately obtained over the rotation angle range of ±90 degree. Thus, the detectable rotation angle range in accordance with the present invention doubles that of the conventional system in which a pair of polarizer panels are used in combination.

(d) The disposition of the pair of photo-sensitive elements at positions symmetric to the center of rotation of the sensor disc on the central or neutral line B-B' enables the output from the optical quantity difference detecting mechanism to keep a linear state which is well suited for easy control. That is, when the rotation angle sensor in accordance with the present invention is used for navigation course finding or steering, deviation of the current advancing (or sailing) direction from the standard direction can be represented in a linear fashion. In reference to this represented deviation, a control signal for compensation can be fixed very easily, which is used for either manual or automatic correction of the advancing (or sailing) direction to the standard direction.

I claim:

1. An improved rotation angle sensor comprising, a sensor disc supported at the center thereof coinciding with the center of rotation of said rotation angle sensor, said sensor disc allowing a light to pass through at least a part of the area of said disc, a pair of photo-sensitive elements arranged spatially on one side of said sensor disc, a light source system arranged spatially on the other side of said sensor disc, and a detecting mechanism electrically coupled to said photo-sensitive elements for generation of an output corresponding to detected difference in incident optical quatity, said sensor disc and said photo-sensitive elements being relatively rotatable to each other about said center of rotation and the optical transmittancy of said sensor disc changes in a continuous manner from more opaque to more light transmissive with distance in one direction along a selected diametral line across said disc and the transmittancy is constant along any line crossing said selected diametral line at right angles thereto.

2. An improved rotation angle sensor as claimed in claim 1 in which said sensor disc is rotatable about said center of rotation and said photo-sensitive elements are immovable.

3. An improved rotation angle sensor as claimed in claim 1 in which said photo-sensitive elements are revolvable about said center of rotation and said sensor disc is immovable.

4. An improved rotation angle sensor as claimed in claim 1 in which said photo-sensitive elements are arranged along a diametral line of said sensor disc at positions on both sides of the center of rotation.

5. An improved rotation angle as claimed in claim 4 in which said photo-sensitive elements are arranged symmetric to said center of rotation.

6. An improved rotation angle sensor as claimed in claim 5 in which said photo-sensitive elements are arranged along a diametral line of said disc and said selected diametral line of said disc is intersectable at a right angle to said diametral line along which said photo-sensitive elements are arranged.

7. An improved rotation angle sensor as claimed in claim 1 in which said sensor disc is suspended in and is coaxially encased within a cylindrical closed casing in a freely rotatable arrangement; a bipolar magnet is coaxially fixed to said sensor disc, said photo-sensitive elements are fixed to one end closure of said closed casing, and said light source system is fixed to the other end closure of said closed casing.

8. An improved rotation angle sensor as claimed in claim 7 in which said sensor disc and said magnet are carried by an upright pin fixed to the center of said one end closure.

9. An improved rotation angle sensor as claimed in claim 1 in which said sensor disc is coaxially fixed to an inner block of a gimbal support of a linear tracking arm system, said photo-sensitive elements and said light source system are fixed to a framework supporting said inner block in horizontally rotatable fashion, and said inner block is rotatable with a tone arm via an outer block of said gimbal support.

10. An improved rotation angle sensor as claimed in claim 9 in which said detecting mechanism is operationally coupled to a servo-mechanism for controlling travelling of a carriage incorporating said gimbal support along given guide rails of said linear tracking arm system.

11. An improved rotation angle sensor as claimed in claim 1 further comprising a weighing balance including a stand and beams rotatably supported on said stand, said sensor disc is fixed to said beams of said weighing balance.

12. An improved rotation angle sensor as claimed in claim 1 in which said detecting mechanism comprises a balanced bridge circuit incorporating said photo-sensitive elements as variable resistors.

* * * * *